G. HAYES.
Skylight.
No. 8,688. Reissued April 29, 1879.
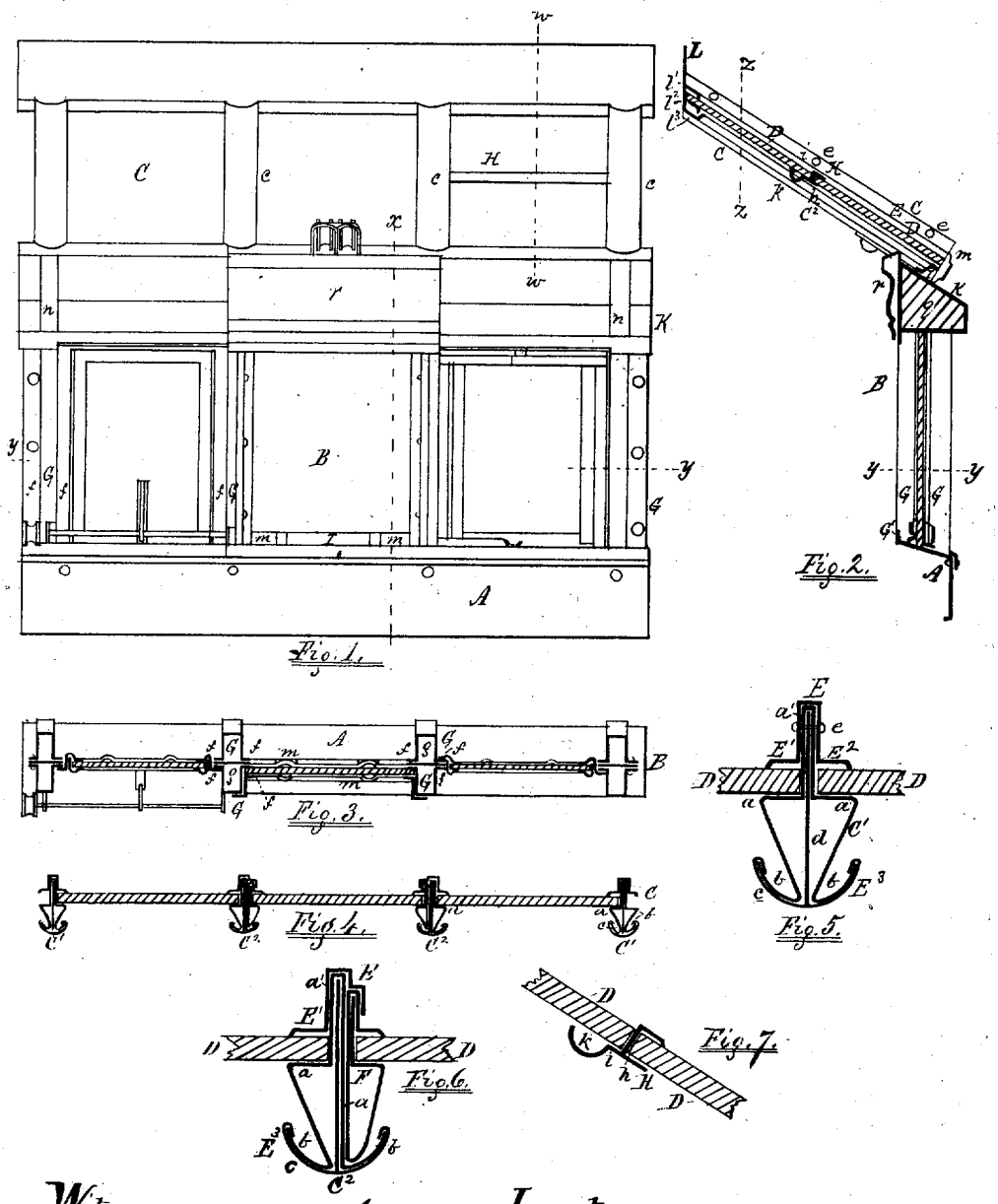
Witnesses:
George A. Hayes
Elizabeth Hopkins
Inventor.
George Hayes.

UNITED STATES PATENT OFFICE.

GEORGE HAYES, OF NEW YORK, N. Y.

IMPROVEMENT IN SKYLIGHTS.

Specification forming part of Letters Patent No. 112,594, dated March 14, 1871; Reissue No. 5,650, dated November 11, 1873; Reissue No. 8,688, dated April 29, 1879; application filed January 21, 1879.

*To all whom it may concern:*

Be it known that I, GEORGE HAYES, of the city, county, and State of New York, have invented new and useful Improvements in Skylights, Conservatories, and other Glazed Structures, of which the following is a specification.

My invention consists, first, in the novel construction of the roof-bars, applicable to all kinds of structures where glass is used in connection, and may be used flat, curved, or inclined at any angle. In this bar or rafter the gutters which serve to receive the drainage from opposite sides of the bar are brought into close proximity with each other, or, in other words, the hollow bar is contracted toward its center to form gutters below the supporting-surfaces of the glass, whereby the width of the bar is not materially or at all increased by reason of the gutters, so that the latter offer little or no obstruction to the light passing through the glass, and the bar is more symmetrical and lighter in appearance. I form this bar of one piece of sheet metal folded at the ridge, and its lower edge turned up properly to form the gutters which serve to carry off the water arising from leakage or condensation to horizontal gutters in the frame or base or where desired.

My invention further consists, in combination with a bar formed as above—*i. e.*, having high ridge reaching vertically upward above the surface-line of the glass—of a cap, formed to straddle the aforesaid ridge, fitting closely thereto for a proper distance downward, riveted or otherwise suitably secured thereto, and at a suitable point above the surface-line of glass provided with wings or flanges having their outer edges brought closely to the surface of the glass with or without putty filling in a secure manner.

My invention further consists of a bottom cap or cover, in combination with said bar, curved or formed to cover the lower face of said bar, said cap having its upper outside edges turned over upper outside edges of the gutters, clasping the same, preventing thereby any tendency to spread.

The bar may be made and used without upper or under cap, or with either or both, as desired.

When it is required to provide for a movable light or sash, then the one-half of said bar is suitably reduced and shaped to accommodate the same.

This peculiarity of construction forms another part of my invention.

My invention further consists in a peculiarly-constructed clip or transverse bar for the transverse joints of the glass in large spans, the said bar being formed of sheet metal bent to constitute a groove for the lower pane of glass and rebet for the upper one in a sloping roof or like structure, the glass being necessarily in sections, the object being to bring their edges together to form a butt-joint and obtain even surface.

It also consists in providing said bar with a gutter to form a combination with other gutters of the skylight to carry off condensed vapor or other water that may have found its way beneath the glass. The stop-strips, or pieces against which the panes or sashes rest, I also prefer to construct with corrugations, to provide an escape for both outside or inside collections of water, and to give strength. Likewise the uprights or side posts where vertical lights are used in connection are of a novel and advantageous construction.

The transom in such structures is of sheet metal, stiffened by cast-iron blocks, and usually filled in with timber.

The bars, frame, transverse bars, caps, &c., may be used to form skylights of great variety of size or shape, domes or flat or curved roofs, &c., and for conservatories, stores, dwellings, &c.

My invention further consists in the novel construction of a vertical plate to which the upper ends of rafters are attached in a sloping or pitched skylight, the said plate being provided with flanges to cover the upper joint or edge of glass plates, and the said plate also provided with a gutter, if desired, communicating and effecting a combination with the other gutters of skylight, to catch any possible drip or leakage. However, this latter may be dispensed with where unnecessary.

Referring to the accompanying drawings, Figure 1 is a side elevation, as viewed from the interior, of a conservatory in part constructed in accordance with my invention; Fig. 2, a vertical transverse section of the same on lines *w w* and *x x* of Fig. 1. Fig. 3 is a horizontal section through lines *y y* of Figs. 1 and 2. Fig. 4 is a section denoted by line *z z* of Fig. 2. Fig. 5 is a transverse section, on a larger scale, of a roof-bar with cap-plates, showing the same as holding two sheets or panes of glass in between them under a fixed condition of said lights. Fig. 6 is a like view of like parts under a moving or sliding arrangement of one of the lights. Fig. 7 is a view, on enlarged scale, of the clip for the joints of the glass, as shown in Fig. 2.

A represents the base portion of one of the sides of a conservatory or other structure where light is a desideratum; B, the glazed side of said structure, and C the one-half or portion of its roof.

$C^1$ $C^2$ are the roof-bars or rafters. These bars may be made either single or double, accordingly as they are intended for fixed or movable lights. For fixed lights the bar marked $C^1$ is used, and, as more clearly shown in Fig. 5, is formed of a metal plate or body, *a*, having a high ridge, *a'*, at the top extending above the surface-line of the glass to a suitable height to receive a proper cap, and bent or shaped to give a broad base immediately below the adjacent panes of glass D D, and which terminates below in reversely inclined or approximating sides, bent at their extremities to form curved gutters *b b*, and when extra strength is required a stiffening-plate, *d*, is inserted up its center.

E is the cap-plate, bent to incase the upward projection or extension above the glass, forming a ridge to the bar, and to be riveted or otherwise properly secured thereto, and having flanges or wings E' E'', formed to have their outer edges lie in close proximity to the upper surface of the glass plates, the same covering and protecting the joints, and when putty is used protecting that also. The said cap is also materially important in keeping the glass securely in place. An under cap is hown at $E^3$, in shape conforming to bottom of bar $C^1$, upper edges clasping upper edges of bar-gutters, covering joint of bar bottom, making a complete finish and neat appearance, and preventing any tendency to spreading in the bar.

For a movable light (or sash) the bar is modified, its essential features remaining—viz., juxtaposition of gutters *b b*—and its advantages of less obstruction to light than when the wider-spread gutters are used.

The bars are shown in Fig. 6, $C^2$. Under such modification the sheet is bent to form base on one side for glass, but having two gutters, *b b*, connected by trough-shaped plate *c*. Here a double cap-plate, E, is used, one section being carried by the movable sash F. The movable section or sash F consists of border-bars provided with rabbets, upon which is secured the glass. These border-bars are formed to fit into the bars $C^2$ when sash is shut, so that they form a half of said bars, the rabbet being on the movable half, but the gutter belonging to the permanent half.

The uprights or side posts G G are composed of two reversely-arranged trough-shaped bars with flanges *f f* on opposite sides of their faces, (see Fig. 3,) said bars lying with their faces one against the other, and being secured together by rivets passing through their flanges, with or without a stiffening-plate, *g*, between the bars or halves. Against the flanges the glazing is placed, or a glazed sash, as may be necessary. The flanges form rabbets, the whole being formed of sheet metal. This is a neat and yet strong construction, and the side flanges form good bearing-surfaces for the glass or sashes.

The clips H or transverse rafters I form, as in Figs. 2 and 7, of a piece of sheet metal bent to form a groove, *h*, for the lower pane of glass, a rabbet, *i*, for the upper one; and I also usually add a gutter, *k*, arranged so as to communicate with the gutters of sloping bars and carry off condensed vapor or any water that may have found its way beneath the glass. The object of the clip is to provide support for glass plates, when in sections, and admit them on a level with a butt-joint and uniform surface.

The stops, strips, or bars I, forming base for panes or sashes, I prefer to construct with corrugations *m*, to provide for escape of water and give strength.

The transoms K of the structure shown are hollow, of sheet metal, stiffened by cast-iron blocks *n*, at suitable distances apart, and intermediate filling of wood, *q*, the whole faced internally, if desired, with plate *r* of ornamental configuration.

In Fig. 1 only the central portion of transom is thus filled and faced, but may be extended throughout.

At L is shown the vertical plate at upper end of bars, to which they are attached, having flanges $l^1$ $l^2$, and also provided with gutters $l^3$.

By the means shown it will be readily understood that a tight staunch structure is produced, combining lightness with strength, also security against fire and water.

A gutter, G', is formed in the sill or base plate at bottom of the vertical sashes. An upturned flange forms its back, and the sash-stop forms its front.

What I claim as my invention, and desire to secure by Letters Patent of the United States, is—

1. The hollow metallic bar or rafter $C^1$ or $C^2$, formed of one piece of folded sheet metal, having upward vertical extension *a'*, forming a ridge, and its lower portions approaching each other and then turning outward and upward to form gutters below the rabbets or supporting-bases for the glass, substantially as as shown and described.

2. The hollow metallic bar or rafter $C^1$ or $C^2$, constructed, substantially as described, of plates *a* and *c*, bent to support or connect each other and to form gutters *b b*, arranged in juxtaposition to each other and under cover of the base or bases which support the glass, as herein set forth.

3. The clip H, constructed of sheet metal bent to form a groove, *h*, rabbet *i*, and with or without gutter *k*, essentially as and for the purpose set forth.

4. In combination with a skylight-bar of sheet metal with ledges to support glass, and gutters beneath, also having high ridge *a'*, the cap E, provided with flanges or wings E', substantially as and for the purpose set forth.

5. In combination with inclined bars $C^1$ or $C^2$, one or more transverse or bridge bars having groove *h* and rabbet *i*, to carry ends of glass, without their lapping, and thereby constituting a butt-joint, substantially as shown and described.

6. In a metallic skylight, one or more movable sashes or sections, consisting of one or more glass plate provided with metallic borders, forming rabbets by which said glass is supported, and which borders are formed to fit into or come into such combination with rafters at each side as when united to form substantially one whole, the inside gutters of rafters at each side answering as gutters to borders also, essentially as shown and described.

7. In combination with base sill-plates A, transom or lintel K, and glass or glazed sashes, the posts G, composed of sheet metal (each) in two halves, jointed vertically, united by flange-formed rabbets *f* for reception of the glass or sashes aforesaid, the whole combined and arranged to constitute the vertical walls of a turret, conservatory, or glazed structure, essentially as shown and described.

GEORGE HAYES.

In presence of—
GEORGE A. HAYES,
ELIZABETH HAPPENS.